US007849015B2

(12) United States Patent
Opiela et al.

(10) Patent No.: US 7,849,015 B2
(45) Date of Patent: Dec. 7, 2010

(54) ELECTRONIC POSTAL MONEY ORDER METHOD AND SYSTEM

(75) Inventors: Michael S. Opiela, Rockville, MD (US); Ronald E. Garey, Washington, DC (US)

(73) Assignee: The United States Postal Service, Washington, DC (US)

(*) Notice: Subject to any disclaimer, the term of this patent is extended or adjusted under 35 U.S.C. 154(b) by 53 days.

(21) Appl. No.: 09/945,734

(22) Filed: Sep. 5, 2001

(65) Prior Publication Data

US 2002/0120562 A1 Aug. 29, 2002

Related U.S. Application Data

(60) Provisional application No. 60/231,164, filed on Sep. 8, 2000.

(51) Int. Cl.
*G06F 17/00* (2006.01)
(52) U.S. Cl. ............................. 705/50; 705/60; 705/61; 705/62; 705/408
(58) Field of Classification Search .................. 705/45, 705/39, 1, 50–80, 408
See application file for complete search history.

(56) References Cited

U.S. PATENT DOCUMENTS

| 5,119,293 | A | * | 6/1992 | Hammond | 705/24 |
| 5,377,271 | A |   | 12/1994 | Foreman et al. | 380/51 |
| 5,570,960 | A | * | 11/1996 | Smith | 400/74 |
| 5,667,315 | A | * | 9/1997 | Smith | 400/78 |
| 5,686,713 | A | * | 11/1997 | Rivera | 235/380 |
| 5,787,405 | A | * | 7/1998 | Gregory | 705/45 |
| 5,870,711 | A | * | 2/1999 | Huffman | 705/8 |
| 5,956,687 | A | * | 9/1999 | Wamsley et al. | 705/1 |
| 6,012,048 | A | * | 1/2000 | Gustin et al. | 705/39 |
| 6,029,141 | A | * | 2/2000 | Bezos et al. | 705/27 |
| 6,088,684 | A | * | 7/2000 | Custy et al. | 705/35 |
| 6,119,106 | A |   | 9/2000 | Mersky et al. | 705/40 |
| 6,236,972 | B1 | * | 5/2001 | Shkedy | 705/1 |
| 6,293,469 | B1 | * | 9/2001 | Masson et al. | 235/476 |
| 6,343,271 | B1 | * | 1/2002 | Peterson et al. | 705/4 |
| 6,510,992 | B2 | * | 1/2003 | Wells et al. | 235/385 |
| 6,575,362 | B1 | * | 6/2003 | Bator et al. | 235/381 |
| 7,110,978 | B1 | * | 9/2006 | Chin | 705/39 |
| 2001/0034700 | A1 | * | 10/2001 | Foss et al. | 705/38 |
| 2002/0005431 | A1 | * | 1/2002 | Siefert et al. | 235/379 |
| 2002/0010627 | A1 | * | 1/2002 | Lerat | 705/14 |
| 2002/0019754 | A1 | * | 2/2002 | Peterson et al. | 705/4 |

(Continued)

OTHER PUBLICATIONS

Kara, WO 99/21330 Prority Date Oct. 17, 1997, Pub. Apr. 29, 1999.*

*Primary Examiner*—Calvin L Hewitt, II
*Assistant Examiner*—John M Winter
(74) *Attorney, Agent, or Firm*—Finnegan, Henderson, Farabow, Garrett & Dunner, LLP (57) ABSTRACT

Provided is an electronic postal money order system and method comprising the purchase and fulfillment of a money order, having the steps of inputting, through a computer, money order identifying data, comprising at least the amount of the money order and addressee data and inputting payment authorization data through a payment authorization terminal. The system also transmits the money order identifying data and payment authorization data to a central server, authenticates the payment authorization data and, upon such authentication, prints a money order corresponding to the inputted money order identifying data and mails the money order to the addressee.

16 Claims, 8 Drawing Sheets

U.S. PATENT DOCUMENTS

| | | |
|---|---|---|
| 2002/0065666 A1* | 5/2002 | Zorrila De San Martin Soto ........................................................................ 705/1 |
| 2002/0073040 A1* | 6/2002 | Schwartz et al. .............. 705/62 |
| 2002/0091603 A1* | 7/2002 | Steiger et al. ................. 705/35 |
| 2002/0097715 A1* | 7/2002 | Roerick ...................... 370/389 |
| 2002/0120562 A1* | 8/2002 | Opiela et al. .................. 705/39 |
| 2002/0152161 A1* | 10/2002 | Aoike .......................... 705/39 |
| 2002/0152180 A1* | 10/2002 | Turgeon ....................... 705/72 |
| 2002/0161702 A1* | 10/2002 | Milberger et al. ............. 705/39 |
| 2002/0161707 A1* | 10/2002 | Cole et al. .................... 705/42 |
| 2002/0198743 A1* | 12/2002 | Ariathurai et al. .............. 705/4 |
| 2005/0091161 A1* | 4/2005 | Gustin et al. ................. 705/43 |
| 2006/0224498 A1* | 10/2006 | Chin ........................... 705/37 |
| 2008/0027877 A1* | 1/2008 | Phelan ........................ 705/76 |

* cited by examiner

TRANSACTIONS APPROVED

127

| MO Cost: | $ 1406.00 |
|---|---|
| MO Fees: | 3.00 |
| Mailing Cost: | 3.00 |
| Receipt Request | .60 |
| | $ 1413.80 |

128

WE THANK YOU
FOR USING OUR SERVICE

CLICK ▲ TO RETURN TO THE MAIN MENU

FIG. 2C

| MAILED Money Orders | |
|---|---|
| Money Orders | Money Orders |
| 2 | $ 550.50 |

CLICK  TO MAIL A MONEY ORDER

CLICK ■ TO REVIEW MONEY ORDERS MAILING STATUS

CLICK  TO EXIT SERVICE

TRANSACTIONS REJECTED

| | |
|---|---|
| MO Cost: | $ 1406.00 |
| MO Fees: | 3.00 |
| Mailing Cost: | 3.00 |
| Receipt Request | .60 |
| | $ 1413.80 |

WE THANK YOU

FOR USING OUR SERVICE

CLICK  TO RETURN TO THE MAIN MENU

FIG. 2F

CUSTOMER NAME: RON GAREY    ACCOUNT# USPS:23234562225
CUSTOMER ADDRESS: 8403 LEE HIGHWAY, MERRIFIELD, VA 22082-8101
CONTACT PHONE NUMBER: (703)280-7057

Batch# _______
MO # _______    Search

| TRANSACTION BATCH # | BANK APPR# & MAILING DATE/TIME | MONEY ORDER SERIAL # | MONEY ORDER COST ($) | MAILING ADDRESSES | MAILING STATUS & ESTIMATED DELIVERY |
|---|---|---|---|---|---|
| P9300128891 | DEBIT-129981Q 3/20/1999 - 9PM $550.50 | S12345679700 | COST: 55.30<br>FEE: 1.00<br>MAIL: 1.00<br>RECEIPT: .60<br>$ 57.90 | G.WALKER<br>8891 MT. THOMAS CIR<br>PO BOX 1992<br>NEW YORK CITY<br>NY 10199-1992 | CURRENT LOCATION:<br>NYC-10199-1992 POBOX<br>EST.DELIVERY:<br>3/22/1999 - 9PM<br>DELIVERED:<br>3/22/1999 - 2PM |
|  |  | S12345679800 | COST: 490.30<br>FEE: 1.00<br>MAIL: 1.00<br>RECEIPT: .60<br>$ 492.60 | MARY WALKER<br>JAMESVILLE COLLEGE 9909 W.<br>GATE RD<br>WHEATON, MD 20902-1234 | CURRENT LOCATION:<br>WHEATON-20902-1234 Home<br>EST.DELIVERY:<br>3/22/1999 - 9PM<br>DELIVERED:<br>3/21/1999 - 9AM |
| P9339980003 | DEBIT-1555540Q 3/30/1999 - 1PM $1413.80 | S67580099806 | COST: 700.00<br>FEE: 1.00<br>MAIL: 1.00<br>RECEIPT: .60<br>$ 702.60 | DAN WALKER, SR<br>12289 LINCOLN ROAD<br>DES MOINES,<br>IA 50018-1098 | CURRENT LOCATION:<br>DESMOINES-50318-1098 POBOX<br>EST.DELIVERY:<br>4/1/1999 - 3PM<br>DELIVERED:<br>*** PROCESSING *** |
|  |  | S67580099816 | COST: 126.00<br>FEE: 1.00<br>MAIL: 1.00<br>RECEIPT: .60<br>$ 128.60 | PEPCO<br>2230 22nd Street, NW<br>PO Box 8888<br>DC 20003-0008 | CURRENT LOCATION:<br>DC-20003-9998 P&DC<br>EST.DELIVERY:<br>3/31/1999 - 9PM<br>DELIVERED:<br>3/30/1999 - 7PM |
|  |  | S67500099826 | COST: 500.00<br>FEE: 1.00<br>MAIL: 1.00<br>RECEIPT: .60<br>$ 502.60 | WILLIAM CARTER<br>909 LEE HIGHWAY<br>CHERRYDALE,<br>CA 99030-4651 | CURRENT LOCATION:<br>LAX - 99001-9995 P&DC<br>EST.DELIVERY:<br>3/30/1999 - PM<br>DELIVERED:<br>*** PROCESSING *** |

CLICK TO RETURN TO MAIN MENU

FIG. 3

ELECTRONIC POSTAL MONEY ORDER METHOD AND SYSTEM

CROSS REFERENCE TO RELATED APPLICATION

This application claims the benefit of priority under 35 U.S.C. section, 119 of U.S. Provisional Patent Application No. 60/231,164, filed Sep. 8, 2000, entitled Electronic Postal Money Order System, the full contents of which are relied on and incorporated herein.

BACKGROUND OF THE INVENTION

1. Field of the Invention

This invention relates to systems and methods for electronic commerce and, more particularly, for facilitating the electronic purchasing of postal money orders from remote locations, using a form of payment other than cash, printing the money order and placing it in the mail stream.

2. Description of the Related Art

One of the most popular methods of payment for goods, services and debts is the money order, particularly the postal money order, which is backed by the unquestionable creditworthiness of the United States Postal Service. The recipient of a money order has the assurance that there are funds available for collection, thereby making the money order virtually equivalent to cash. By contrast, a conventional check must first be deposited and routed, typically, through the Federal Reserve Clearing House System for collection. Several days may elapse, during which, the creditor is unsure whether the maker of the check has adequate funds to cover the instrument. Ultimately, if the check is returned for insufficient funds, the creditor may have to pursue time consuming and expensive legal remedies in order to receive payment.

Conventionally, when a customer wishes to purchase a postal money order, an on-site visit to a U.S. Postal Service ("USPS") post office is required. Since post offices are generally not open around the clock, a postal patron may wait several days before his or her schedule permits personally visiting the post office to make the purchase. In addition, payment for money orders other than as a cash transaction, such as by credit card, is not permitted under current USPS rules for at least two reasons. First, there is a probability of fraud when using a credit card. In some instances, a person could use a stolen credit card thus making the USPS liable for the money order. Second, the discount rate for using a credit card can be in some instances two percent of the amount of purchase. Thus, if a $700.00 money order is purchased, it would cost the USPS $14.00 in processing fees, whereas the fee for the money order typically is significantly less than two percent. Thus, a customer may have to first visit a bank or ATM machine to obtain the required cash, thus delaying the process even further. Money orders typically are employed for payment of debts, to pay for merchandise ordered, or to remit payments to parties who are reluctant to accept conventional checks for a variety of reasons. Obviously, the more expeditiously a money order is purchased and mailed, the more beneficial it is to all parties involved. Accordingly, the ability to purchase a money order from remote locations without the use of cash and have it enter the mail stream in a near real time basis, provides numerous advantages.

SUMMARY OF THE INVENTION

The advantages and purposes of the invention will be set forth in part in the description which follows, and in part will be obvious from the description, or may be learned by practice of the invention. The advantages and purposes of the invention will be realized and attained by means of the elements and combinations particularly pointed out in the appended claims.

To attain the advantages and in accordance with the purposes of the invention, as embodied and broadly described herein, the invention is directed to enabling electronic purchasing of postal money orders from remote locations, using a form of payment other than cash, printing of the money order and placement of the same in the mail stream for ultimate delivery to an addressee.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

In the drawings,

FIG. 3 is an exemplary depiction of a screen of a computer showing data associated with transactions for the purchase of money orders.

DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like features.

A Web site is set up having one or more Web pages to allow customers to access the Internet to prepare a money order form, on-line, with payee data, purchaser data, and money order amount. The purchaser then uses an approved electronic payment method. Upon payment validation and approval, the money order data is routed to an authorized print site. The print site receives data from the money order network, prints the data onto official blank money order stock, prints the payee's address on an envelope, and places the envelope containing the money order into the hardcopy mail stream. Such a money order would be handled exactly like a normal money order from the payee's perspective.

Individuals and home office users would be able to access the postal money order Web site through the Internet on an around-the-clock basis, either directly or through links from other Web sites, enabling them to create, purchase and transmit the USPS on-line money order to pay for goods and services through the Internet.

The electronic postal (ePostal) money order system enables postal patrons who are located away from traditional "brick and mortar" post offices to carry out the process of postal money order purchasing, payment and mailing. Once the patron has ordered the money order and payment therefore has been accepted, the postal money order is printed, inserted into an envelope and placed into the mail stream without any additional involvement on the patron's part.

Figure 1:
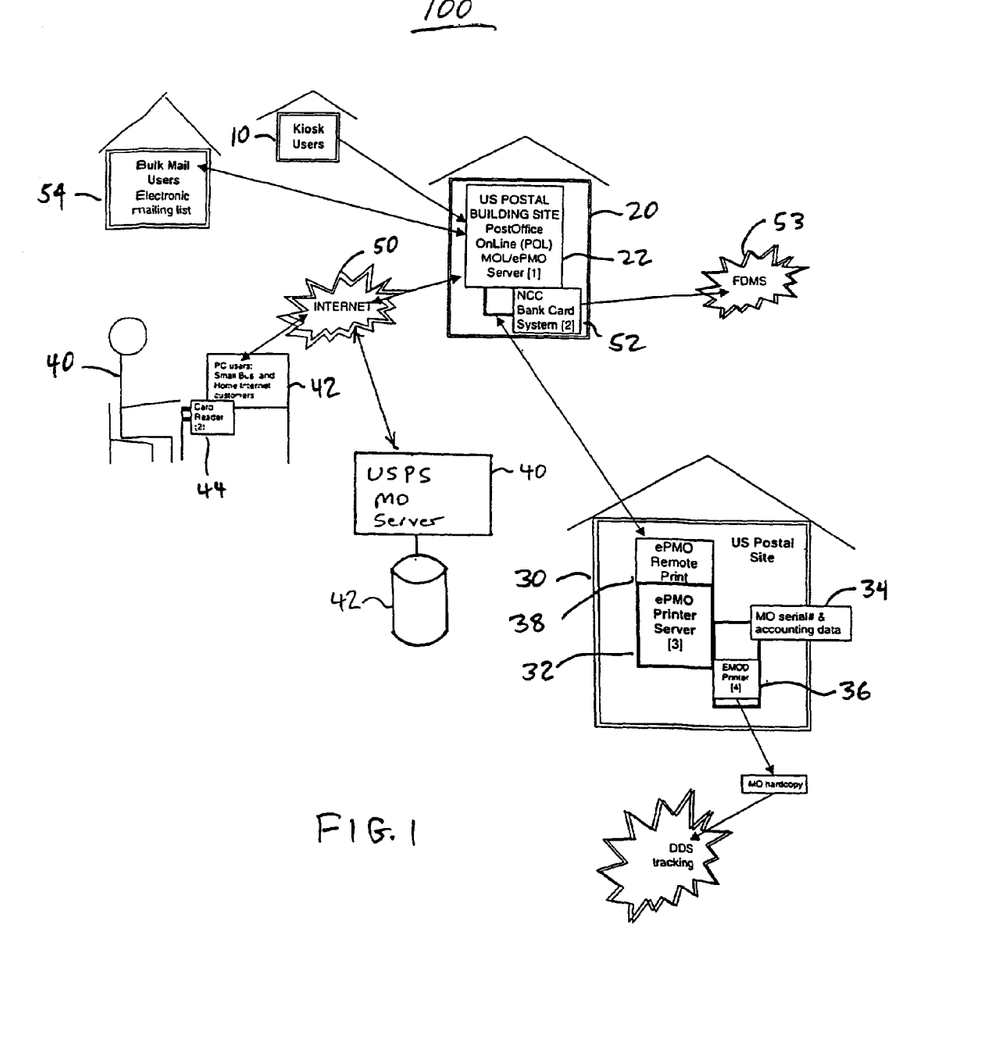
FIG. 1 illustrates a block diagram representation of an exemplary electronic postal money order system.

Referring now to FIG. 1 of the attached drawing, in the preferred embodiment, the system allows a patron or user to visit a high security, tamper-proof kiosk 10 which may generally be located remotely from a traditional post office building, or in the lobby of a post office for access when the post office service windows are closed. Kiosk 10 is provided with a computer networking hardware, software and communications facilities (not shown) to permit connecting to, and communication with, an electronic postal money order system server 22 which may be situated in a more or less central location, such as at a USPS administrative building 20, to thereby serve any number of kiosks 10. It is also contemplated that postal patrons who are situated at home or business locations may also use the electronic postal money order system. For example, a home or business user 40 with a personal computer 42 having the capability of connecting to the Internet 50 may also engage in the purchase of postal money orders. Whether over an Internet connection accessed from homes or businesses, or from kiosks, patrons will be presented with a USPS Web page containing a menu of available services and informational data, including a USPS electronic postal money order page.

Figure 2A:
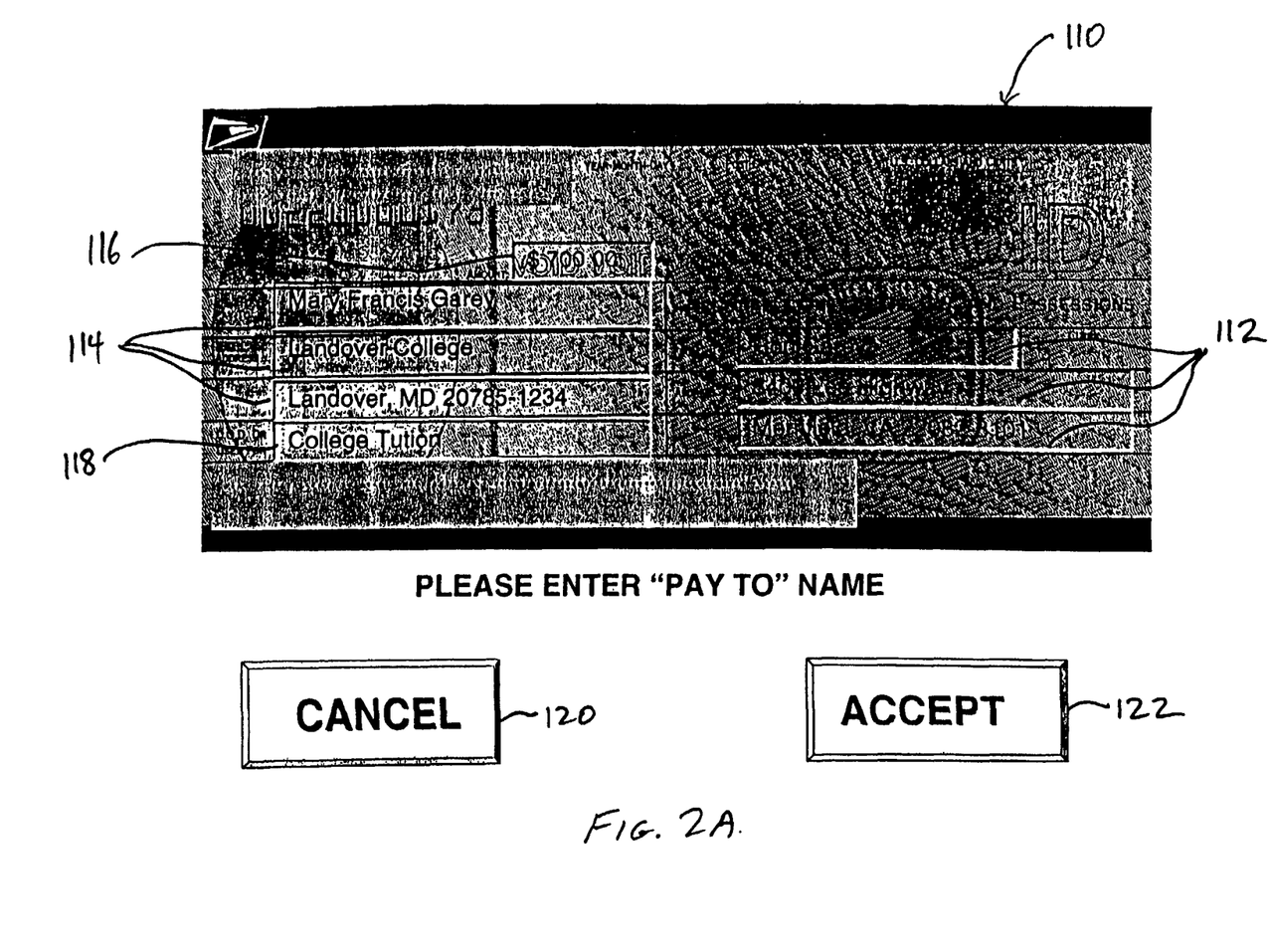
FIGS. 2A-2F are exemplary depictions of a screen of a computer terminal showing various data associated with transactions for the purchase of money orders.
Figure 2B:
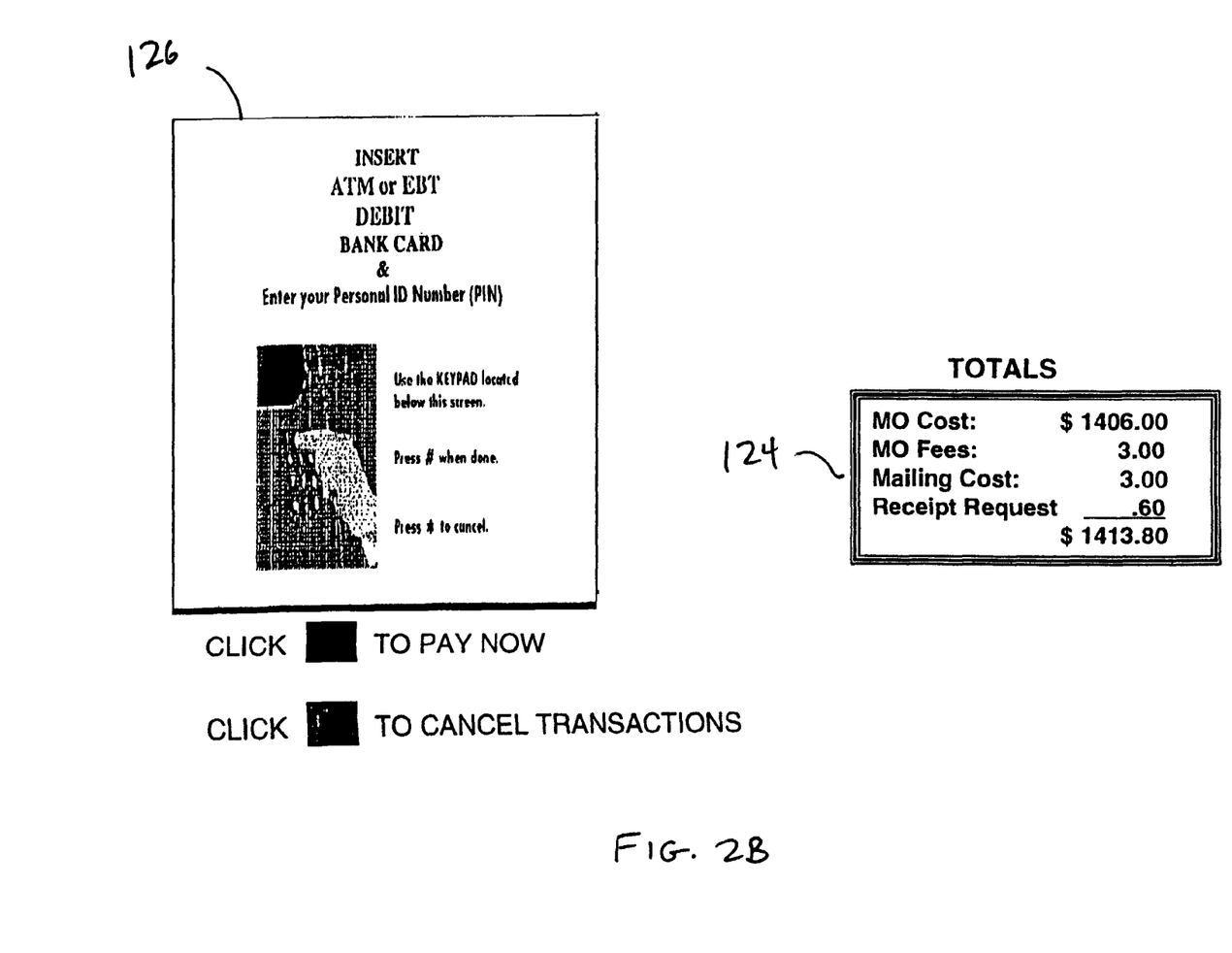

Referring to FIG. 2A, an electronic postal money order page, as displayed on the kiosk or other computer monitor, is depicted as a representational template 110 of an actual paper money order containing fields which the customarily patron fills in. The fields include the name and address of the recipient 112 and of the sender 114 and the face amount 116 of the money order. Additional fields may be provided, such as a description of the purpose which the postal money order is intended 118. Using a keyboard provided at the kiosk or the PC keyboard, the patron completes template 110 and observes from the monitor that the information, as typed in, was accurately entered and the required fields have been completed. The patron then selects a "CANCEL" or "ACCEPT" button 120, 122, respectively, for example, via a mouse, keyboard or touchscreen. As shown in FIG. 2B, a pop-up window 124 showing the individual costs of the money order, money order fee, and the cost of mailing the money order to the recipient, as well as the totaled net amount appears on the display. The patron then selects a "PAY NOW" or "CANCEL TRANSACTIONS" button. If the patron opts to pay, the system will prompt the user to pay for the money order.

Each kiosk 10 is furnished with an electronic card reader (not shown), similar to card readers commonly deployed at ATMs. Since a money order is virtually as good as cash, in the preferred embodiment only certain types of cards are acceptable. In general, only cards which, upon use and validation, result in a hold on the cardholder's funds being immediately placed by the depository institution are accepted by the ePostal money order system. Examples of such types of cards are online ATM debit cards and can include ATM cards, Electronic Benefit Transfer ("EBT") cards, military SVC cards and bank debit cards. It is, however, within the scope of the invention to allow the use of conventional credit cards to pay for electronic postal money orders. Thus, upon entering the requisite data for the electronic postal money order, the patron is prompted via window 126 to insert an approved card, followed by inputting a Personal Identification Number ("PIN") for security purposes. Upon the authenticity of the card and the availability of funds being confirmed, a Transaction Tracking Number is assigned to the particular purchased money order which enables the customer to track the whereabouts of the envelope containing the money order, including whether it was delivered to the recipient and presented for payment or cashed. It is to be noted, that for security and privacy reasons, the entire transaction may be carried out over secure Web connections, using, for example, well known Secure Socket Layer technology and public key encryption techniques. In addition, ePostal money order Web pages are designed so that they cannot be tampered with during data entry, nor any of its documentation be copied by Internet users.

In cases where a postal patron is at a location other than a kiosk, such as at home or a business location, the personal computer (PC) will have connected to it a card reader 44 into which the customer inserts an appropriate approved card and keys in a PIN number. The authentication process is otherwise as previously described.

Figure 2C:
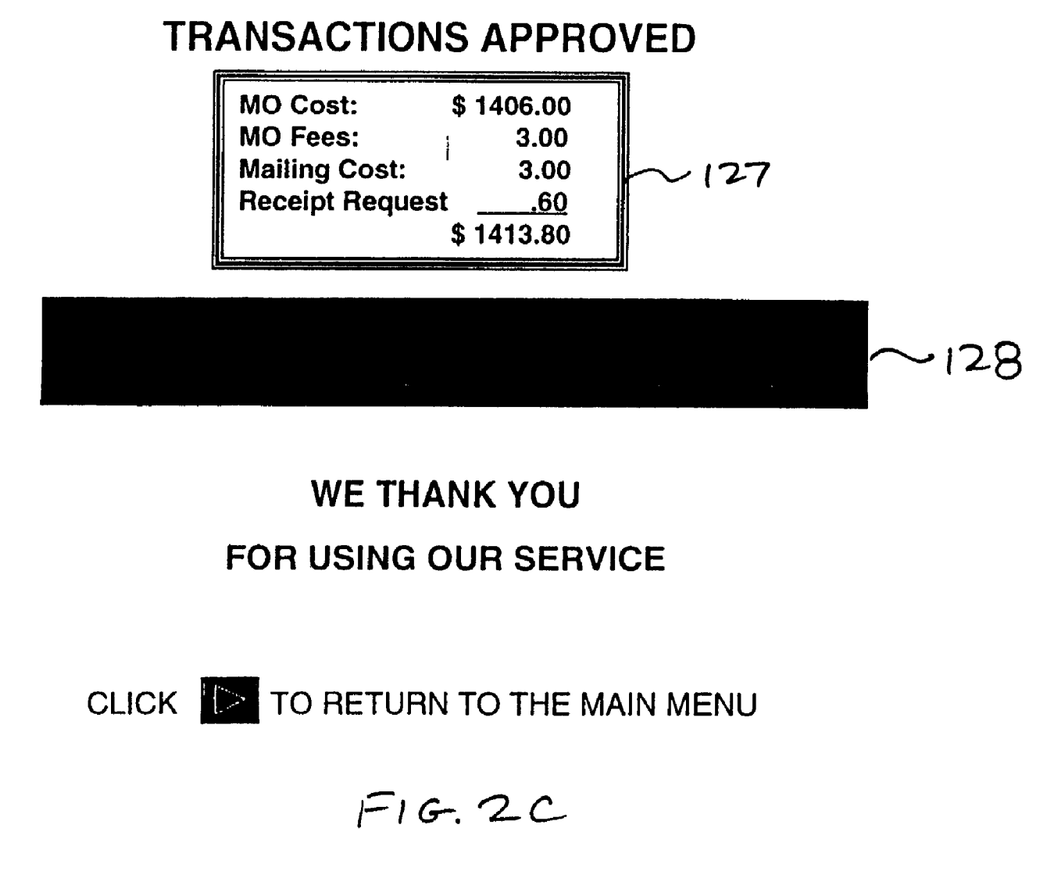

Referring to FIG. 2C, upon completion of the money order electronic form, and electronic payment authorization, the system stores the transaction, displays a summary in window 127, and assigns a tracking number 128 for later batch transmission via the Internet to a designated USPS Electronic Postal Money Order server 40. This batch transmission can be initiated, for example once every 24 hour period, with the ability to change the time and/or frequency of transmission, based-upon the best window of Internet accessibility.

An online debit card payment system provides data updating of the Electronic Postal Money Order main database 42 for the money orders being paid by using a PC-PAY card reader type device, and electronic bulk Electronic Postal Money Order mailer data including, for each money order, the addressee "PAY TO" name, address, money order amount, and the combined cost of all money orders for approval by USPS and First Data Merchant Services ("FDMS") bank card processors. The payment function also accepts authorized, off-line, stored-value cards such as the Navy Cash Card.

In addition, a Universal Card Acceptor system ("UCA") detects and processes a number of card types, including by way of example, Debit bank cards and Credit bank cards;
'Liberty Cash Cards' (USPS private brand cards); and
Electronic Benefit Transfer bank/cash cards (including state/federal government and military-issued cards).

A database 42 of money orders ordered through the Electronic Postal Money Order system is also generated and maintained. Database 42 also includes a customer profile capability, allowing Electronic Postal Money Order frequent customers the option to pre-set recurring Electronic Postal Money Order payment orders as to preset for both payee and amount. This customer profile can be accessible through the local kiosk server 10 when the customer inserts a Smartcard and/or login identification ("ID") and PIN number. Database 42 is designed to meet the compliance requirements of the Federal Bank Secrecy Act. All transactions at any time associated with a customer may be tracked so that daily USPS money order limits of, for example, $10,000 in a calendar day, are not exceeded through the use of Electronic Postal Money Order system.

Individual Money Order Serial Numbers scanned during the printing process and transmitted from the Electronic Postal Money Order Printer Server to a main Electronic Postal Money Order printer server 32 are captured.

A tracking capability allows the user to check the status based on either the initial transaction number or the serial numbers (once these have been captured in the printing process). This function is implemented so that insertion of a user's login ID and password and/or a military Smartcard, will show the user all Electronic Postal Money Order transactions performed in a selected time period, for example, in the last, 30 calendar days, as shown in FIG. 3.

An Audit Log 34 keeps a record of money orders ordered through the Electronic Postal Money Order Server and money orders printed via the Electronic Postal Money Order Print Server 32.

At periodic intervals, for example, every 4-hours, a money order tracking data file can be created from the USPS Data Collection System (DCS) Server detailing the mail piece location in postal mail stream, (the file can include, for example, includes: customer assigned USPS PLANET Code-tracking number, date/timestamp, and destination location postal station) from USPS Money Order Database system. The tracking database can accept a periodic download of data from the USPS DCS server and populate the local kiosk PC or server.

Using a Web browser, a user 40 would connect over the Internet 50 to interface with the designated Electronic Postal Money Order URL Web site on server 22. This site can provide several options, including the ability to purchase Electronic Postal Money Orders. The process begins with an Electronic Postal Money Order Welcome home page. The system can run on a local server 22 connected via the Internet 50, and interfaces with the National Cash Card (NCC)/FDMS and/or the Military Stored Value Card payment systems. Where NCC is a Smartcard reader system. Actual data can be routed via the Internet from kiosk 10 PC through the Electronic Postal Money Order Server to a money order print Server 32 and the data can be printed on a USPS money order form by a designated money order printer 36. The printed information and the money order tracking data from the USPS DCS Server can be stored within the Electronic Postal Money Order Server 32 for access. A periodic download of tracking data from the Electronic Postal Money Order Server 32 to the local kiosk PC or server may be performed on, for example, a daily basis.

When a user enters the designated Electronic Postal Money Order kiosk 10 a local Electronic Postal Money Order Web page displays (not shown). Users may have the option of selecting a "Help" icon or press a "Begin" icon. When the "Help" icon is selected the user will be guided via a demo of an Electronic Postal Money Order ordering process. When the "Begin" icon is pressed, the user is prompted to enter their name, password and insert their debit or access card. When the correct password and card is entered, the main menu displays. The Electronic Postal Money Order icon shown on the menu may also be customized as a direct linking add-on for national banking and major mailers 54 to allow their customers an Electronic Postal Money Order payment option.

A PC User can create several money orders per batch transaction number. As shown in FIG. 2C, information 127 regarding the amount payable for the money orders submitted will be displayed: total value of money orders, service charges for money orders (for example, $0.80 each), and postage.

Figure 2D:
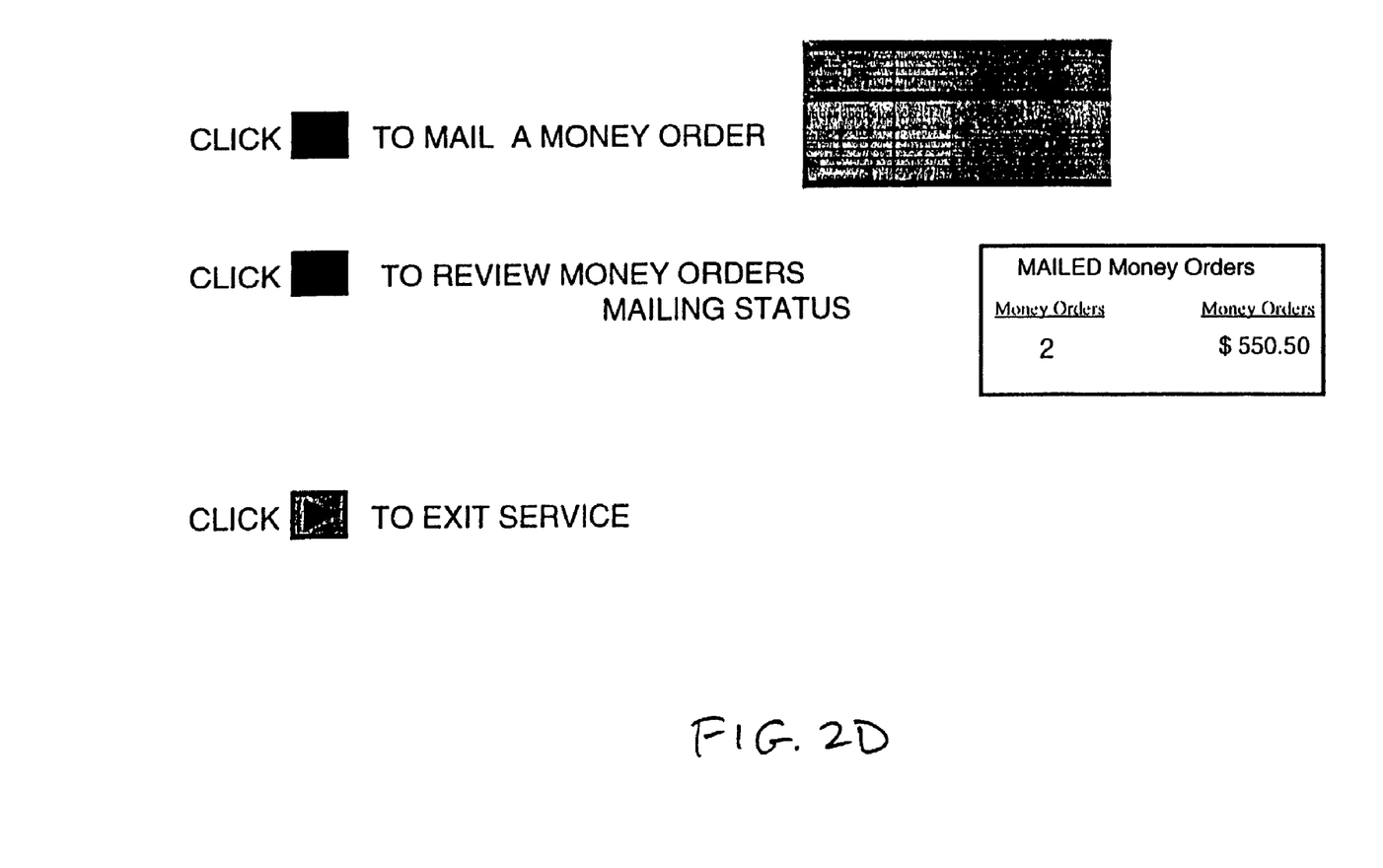
Figure 2E:
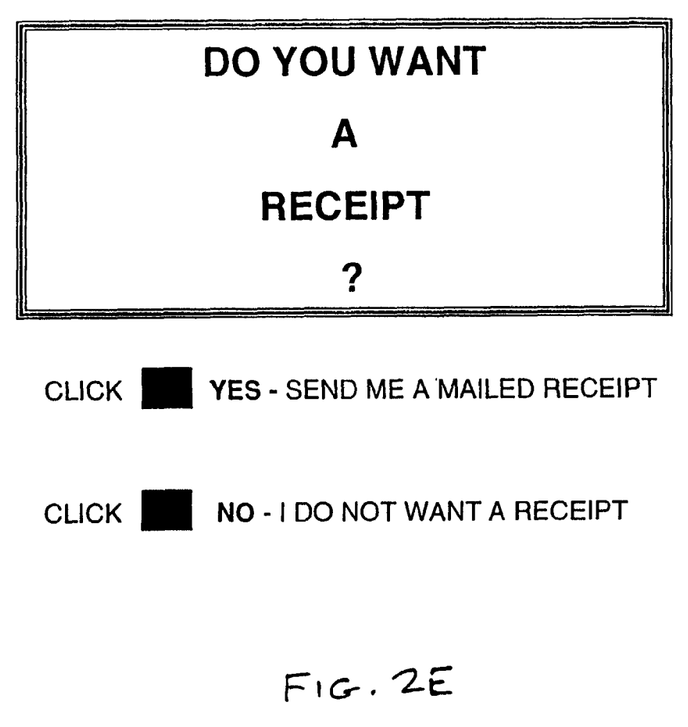
Figure 2F:
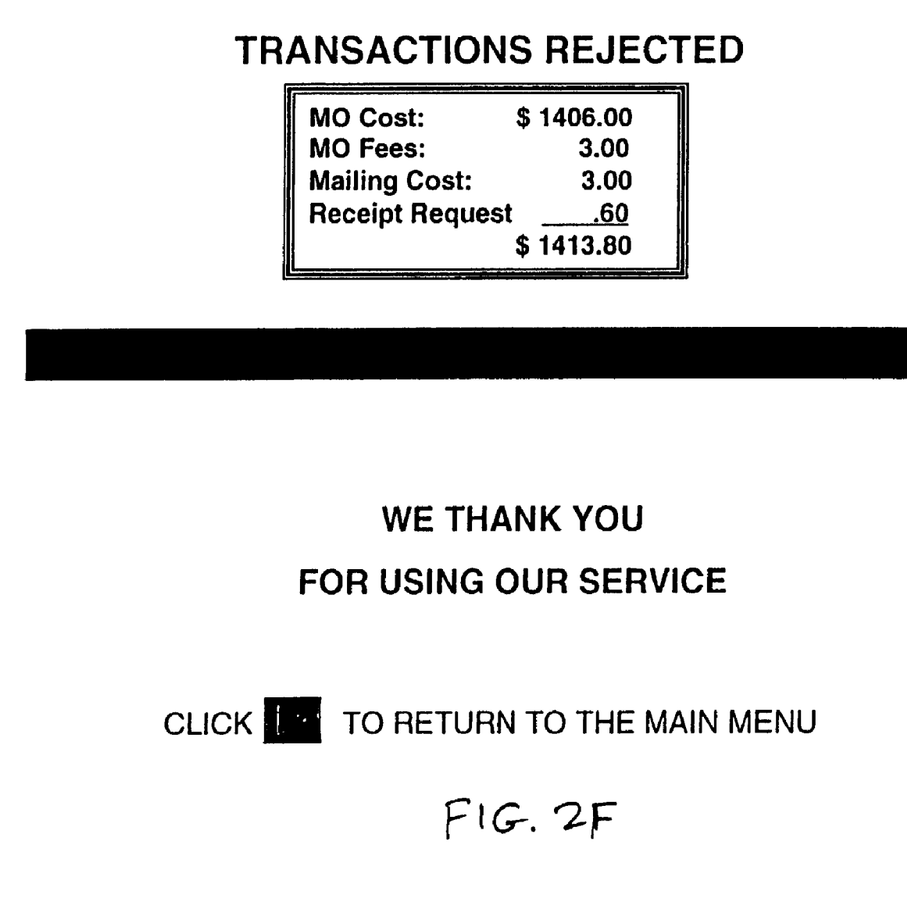

As shown in FIG. 2E, an Electronic Postal Money Order money order receipt can be made available and will be printed, enveloped, and mailed to the entered From Return Address (FIG. 2A).

As shown in FIG. 2B, the user may be given two button options: TO Pay Now or To Cancel Transaction, to thereby perform the following steps:

Clicking on To Pay Now will bring the user to a Payment interface Window 126.

Another option, not shown, is "Enter Another" which, upon clicking, places the cursor in the first data entry field of the money order template 110 and thus permits the process to be repeated. Once a set number of money orders have been submitted, the Enter Another button will be grayed and will no longer be selectable.

Another message stating "Click on any Money Order image to edit or delete" is also presented (not shown). Clicking on the image of any of the (up to the previously set numbers) of money orders will repopulate the template with the data that was submitted for that money order. The user then can be the option of editing the fields or deleting that money order.

Clicking on the Cancel icon 120 deletes all processing and cancels all transactions, and then exiting to the Electronic Postal Money Order main menu page.

Information regarding the amount payable for the money orders submitted can be displayed 124, including, the total value of money orders, plus the money order fee, plus postage, plus receipt.

On clicking To Pay Now (FIG. 2B) the user can be linked to a new page which will prompt the user through the payment process.

The summary information relating to the payment due (total value of money orders, plus fees for money orders and postage) will also be presented on this page.

The user can be prompted to start an NCC application that in turn interfaces to a PC-Pay encrypted keypad.

The user will swipe his or her debit card or insert a Military SVC Smartcard into the pad and key in a PIN number. The PIN number and card account information are separately encrypted and passed back to the server. In an embodiment, no bank card data is stored within the PC-Pay device or within the PC. The data is encrypted on entry. When the card is swiped, it, along with the PIN are encrypted, as well as an NCC data send/receipt software packet. The total value of money orders, and the NCC packet are composed at the Electronic Postal Money Order host into a postal bank card packet (including merchant ID's) and sent to FDMS 53 for approval.

The Electronic Postal Money Order Server 22 can add the payment amount to be debited and pass this to the NCC application 52 that interfaces with the First Data Merchant Services 53 application to effect and confirm payment. A routine is provided that decrypts the account information and passes the information in the appropriate form on to the FDMS application.

The NCC application 52 passes back a message corresponding to "Payment Confirmed" or "Transaction Rejected". When payment is confirmed, NCC will record the banking information into its batch files at the Electronic Postal Money Order Server 22 for automatic end-of-day daily transactions debit/credit settlements with FDMS 53. Daily settlements for Smartcards will be performed by the U.S. Military SVC system managed by the U.S. Treasury Department.

As shown in FIG. 2D, a user can be next presented with a choice of mailing the money order, reviewing the money order, mailing status (for previously mailed money orders) or exiting the process.

The Electronic Postal Money Order Server presents appropriate messages to the user.

If a payment is rejected, the user will be given the option of returning to the data entry page or canceling the transaction. If the user clicks on Cancel, an appropriate warning message will be displayed stating that all data entered will be deleted. Alternatively, the user may click on Edit Money Orders and either reduce the amount or delete one or more money orders. The user may then repeat the Pay Now process with the lower amount.

If the payment is confirmed, the money order data will be entered into a database and the user will be advised that payment is confirmed and asked to note the Transaction Number for tracking purposes. The user will then be given a message, such as "Thanks for using the USPS ePOSTAL Money Order" and given the option to return to the Welcome Page.

Users have the option of using the Electronic Postal Money Order money order tracking page to review the status of their money order. A paper receipt may be printed and mailed to the purchasing customer.

Money Order data submitted can be maintained in a JDBC compliant database 42. The interface between the Web Pages and the Database can be based on Java Servlets. The database can be portable to UNIX based systems.

A master server 40 can perform tracking of all money orders. An Electronic Postal Money Order server 22 stores all Electronic Postal Money Order money order data extracted from the master server 40. The Electronic Postal Money Order server 22 is functionally linked with the kiosk 10 users' access names and passwords, to link stored data with identification data of the users. When the money order is printed, the User's assigned PLANET Code is printed on the outside of the mailing envelope. This code will be scanned as the envelope containing the money orders flows through the USPS mail stream, and is relayed back to the DCS. Master server 40 will send to the Electronic Postal Money Order server periodically (for example, every 4-hours) a money order tracking data file detailing the mail piece location in postal mail stream, (the file can include the following data, for example, customer-assigned USPS Planet Code-tracking number, date/timestamp, and destination location postal station). The Electronic Postal Money Order server 22 will download the updated data to the kiosk 10 PC or server on, for example, a daily basis.

The Money Order printer controller 38 receives data from the Electronic Postal Money Order Print Server 32, prints the Money Order, (including, for example, FROM and PAYEE addresses, amount, transaction code, and dates), stores a batch copy of the Money Order Serial number, and sends a copy of the Money Order Serial number to the Print Server. Print Server 32 then sends data to the Money Order printer The Electronic Postal Money Order printer 36 can also handle printing of Money Order envelopes. Each envelope is printed with the assigned User's DCS PLANET Code, thereby matching the Money Order tracking number with the destination address. Printer 36 prints the paper money order and receipt, cuts and separates the receipt from the money order, then envelopes the money order and also envelopes the receipt. The money order envelope contains the TO destination address, and the receipt envelope can contain the FROM return address. When money order and receipt envelopes are printed, the envelopes will be tracked by USPS master server 40 and its assigned customer PLANET Code. The same PLANET Code is used on the envelopes.

The Electronic Postal Money Order Print Server 32 then updates the Electronic Postal Money Order Server 40.

Each money order envelope is printed with a POSTNET bar-code and a PLANET Code. The PLANET Code is used to track the mail piece as it flows through USPS mail stream.

The Electronic Postal Money Order Server database 42 batch transaction number can be updated with the associated printed money order serial numbers sent from the Electronic Postal Money Order Print Server 32. The confirmation is in the form of an electronic receipt to the user, confirming the batch transaction number and advising that "x" money orders have been printed, and providing their serial numbers, where "x" is the number of transactions. The serial numbers can be used for tracking status, matching the batch transaction number with an associated DCS PLANET Code.

An email can then be sent to the user. The email is not encrypted, since it contains only the user's batch transaction number and the serial number(s). There is no information about the Payees or amounts remitted. Such data can only be accessed through the Electronic Postal Money Order Server 40 via a password.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for the electronic purchase of a money order by a user, comprising:
   receiving, by a computer, an electronic purchase order from the user;
   generating, by the computer, a serial number associated with the money order;
   printing, during a printing process, a hard-copy money order comprising the serial number;
   scanning, by a scanner, the serial number during the printing process;
   transmitting the scanned serial number over a computer network to a remote server;
   receiving, by the remote server, location information of the money order; and
   generating tracking information, using the scanned serial number and the location information.

2. The method of claim 1, wherein the electronic purchase order comprises an amount of the money order and an address of an addressee location.

3. The method of claim 2, further comprising mailing the hard-copy money order to the addressee location.

4. The method of claim 1, wherein the electronic purchase order comprises a payment made using a form of payment selected from one of the group of an ATM card, an Electronic Benefits Card, a Military SVC, a bank debit card, and a credit card.

5. The method of claim 1, further comprising sending the purchaser a confirmation of the purchase via the Internet.

6. The method of claim 1, wherein:
   receiving an electronic purchase order instruction further comprises receiving at least one electronic purchase order instruction corresponding to a plurality of money orders;
   printing further comprises printing a plurality of hard-copy money orders; and
   generating tracking information further comprises generating tracking information associated with movement of the plurality of hard-copy money orders.

7. The method of claim 1, further comprising assigning a PLANET Code to the money order.

8. The method of claim 7, wherein the PLANET Code is printed on an envelope containing the money order.

9. The method of claim 1, wherein the tracking information is accessible via a military Smartcard.

10. The method of claim 1, further comprising generating a database, the database tracking the money order purchases of each customer.

11. The method of claim 10, further comprising:
   totaling the purchases of each customer to obtain a total associated with each customer; and rejecting the electronic purchase order if the purchase order would cause the total to surpass a pre-set amount of money over a pre-set period of time.

12. The method of claim 11, wherein the pre-set amount of money is $10,000 and the pre-set period of time is one calendar day.

13. The method of claim 1, wherein the electronic purchase order is received from a computer connected to the Internet.

14. The method of claim 1, wherein the electronic purchase order is received from an Internet web-site.

15. The method of claim 1, wherein the electronic purchase order is received from a mobile device.

16. The method of claim 1, wherein the electronic purchase order is received from a kiosk.

* * * * *